United States Patent
Boxall et al.

(10) Patent No.: US 6,289,224 B1
(45) Date of Patent: Sep. 11, 2001

(54) METHOD AND APPARATUS FOR STARTING AN ACKNOWLEDGMENT TIMER

(75) Inventors: Robert F. Boxall, Morton Grove; Mouayad Albaghdadi, Buffalo Grove; Robert C. Scheibel, Elmhurst, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/182,709

(22) Filed: Oct. 29, 1998

(51) Int. Cl.[7] .............. H04Q 7/08; H04Q 7/12; H04Q 7/14; H04Q 7/18
(52) U.S. Cl. ............ 455/517; 455/426; 455/458; 455/572; 455/67.6; 340/7.21; 340/7.22; 340/7.23; 340/7.24; 370/350; 370/95.1
(58) Field of Search ............... 340/825.44, 825.45, 340/825.47; 455/550, 31.2, 31.3, 466, 515, 517, 572, 38.1, 38.3, 67.6, 458, 426; 370/350, 95.1

(56) References Cited

U.S. PATENT DOCUMENTS

| | | | |
|---|---|---|---|
| 5,042,029 | * | 8/1991 | Hayakawa ............. 340/825.47 |
| 5,355,516 | * | 10/1994 | Herold et al. ............. 455/453 |
| 5,361,398 | * | 11/1994 | Christian et al. ............. 455/67.6 |
| 5,396,537 | * | 3/1995 | Schwendeman ............. 340/825.44 |
| 5,663,715 | * | 9/1997 | Godoroia ............. 455/31.3 |
| 5,799,012 | * | 8/1998 | Ayerst et al. ............. 455/509 |

FOREIGN PATENT DOCUMENTS

02238735 * 9/1990 (JP) .

* cited by examiner

*Primary Examiner*—William Trost
*Assistant Examiner*—Keith Ferguson
(74) *Attorney, Agent, or Firm*—Jeffrey K. Jacobs

(57) ABSTRACT

A target communication device (106) determines a length of time needed to transmit outbound information. The target communication device then transmits to a sending communication device (112) an indication of a timer value based on the length of time needed to transmit the outbound information. The sending communication device receives the indication and transmits information to the target communication device. The sending communication device determines a timer length using the indication of the timer value and starts a timer, associated with the information transmitted, with the timer length determined.

18 Claims, 3 Drawing Sheets

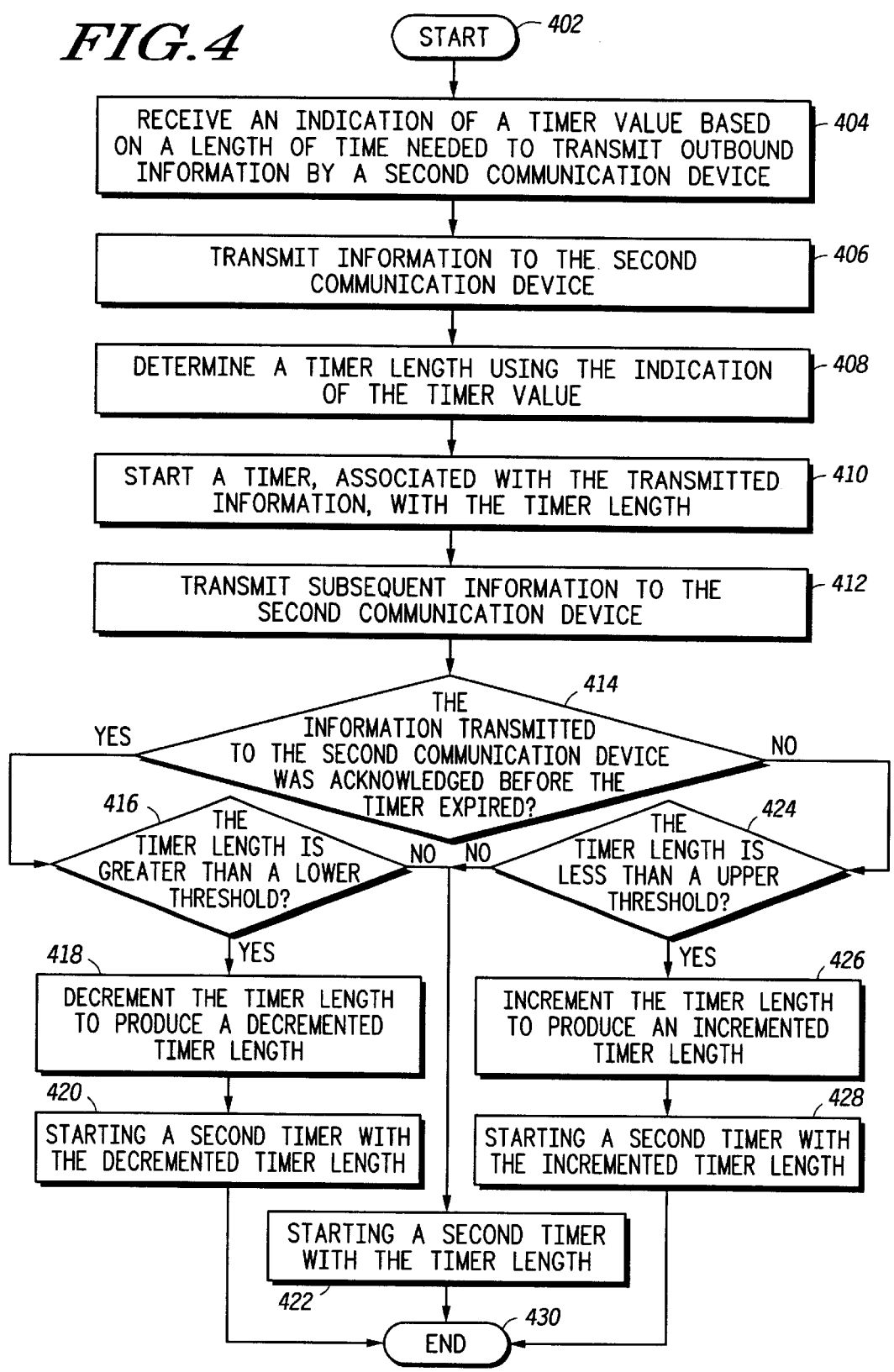

METHOD AND APPARATUS FOR STARTING AN ACKNOWLEDGMENT TIMER

FIELD OF THE INVENTION

The present invention relates generally to communication devices and, in particular, to starting acknowledgment timers in communication devices.

BACKGROUND OF THE INVENTION

Many protocols exist for reliably conveying information from one communication device to another via unreliable communication channels. In some such protocols (such as, automatic repeat request (ARQ) protocols), a sending device transmits information to a target device and, upon receiving the information, the target device transmits a corresponding acknowledgment (ACK) message back to the sending device. Typically, the sending device will set a timer when transmitting the information in case the expected ACK is lost. If the ACK is not received for the information before the corresponding timer expires, the information is retransmitted. Thus, reliable information transfer is achieved.

In such timer-based protocols, the time-out period can affect information transfer characteristics, such as throughput and delay. For example, when the time-out period is too short, a sending device will retransmit information prematurely. A target device may be about to transmit an ACK for some information received from a sending device. But, if a timer corresponding to the information expires in the sending device, the sending device retransmits the information, notwithstanding the fact that the information was received by the target device. Because the time-out period used did not allow the target device to receive, process, and acknowledge the information before the timer expired, the information was not only unnecessarily retransmitted, but also unnecessarily received. Such unnecessary retransmissions inefficiently utilize the communication resources shared by the sending and target devices and, thereby, reduce potential throughput.

On the other hand, when the time-out period is too long, information that needs to be retransmitted is unnecessarily delayed until the corresponding timer expires. Retransmission delay increases the overall information transfer delay and can lead to reduced throughput. For example, the target device may need to buffer received information while waiting for retransmissions of missing information. When such buffers fill, information transfer is effectively halted until some of the retransmitted information is received. Thus, the throughput is reduced.

Therefore, a time-out period which is no longer than the time needed for round-trip link travel and target device processing is optimal. Today, for each acknowledgment timer, designers analyze the amount of time required for link travel and target device processing and attempt to determine an optimal acknowledgment timer value. Such an approach works best when the actual acknowledgment times vary about the selected timer value infrequently or to a small degree. In other words, such an approach works best when the selected timer value in actual practice is rarely too long or too short. The more often the actual acknowledgment times vary from the selected timer value, the less optimal the timer value becomes. The more often the timer value is too short or too long, the more the delay and/or throughput of the information transfer suffers. In systems where the acknowledgment time varies greatly, the resultant throughput reduction and/or information transfer delays can become unacceptable. Thus, acknowledgment timer values determined by today's techniques can become inadequate under conditions of high acknowledgment time variance.

Therefore, a need exists for an apparatus and method for starting an acknowledgment timer, that overcomes the inadequacies of today's timer value determination techniques when acknowledgment times vary.

BRIEF DESCRIPTION OF THE DRAWINGS

FIG. 4 illustrates a logic flow diagram of steps executed by a communication device to transmit information in accordance with an alternate embodiment of the present invention.

DESCRIPTION OF A PREFERRED EMBODIMENT

Generally, the present invention provides a method and apparatus for conveying information between communication devices. A target communication device determines a length of time needed to transmit outbound information. The target communication device then transmits to a sending communication device an indication of a timer value based on the length of time needed to transmit the outbound information. The sending communication device receives the indication and transmits information to the target communication device. The sending communication device determines a timer length using the indication of the timer value and starts a timer, associated with the information transmitted, with the timer length determined.

By conveying information as described above, the present invention overcomes the inadequacies of protocols that use timers with fixed, pre-selected values. In the present invention, the timer that is started when information is transmitted is given a time-out period based on what the target communication device has indicated. The target communication device determines how long it will take to transmit its outbound information and transmits an indication based on the determination to the sending communication device. Using the indication, the sending communication device can start a timer just long enough to allow the target communication device to transmit its outbound information followed by a response to the information transmitted by the sending communication device. In this way, each timer can be dynamically set to a near optimal value based on conditions at that moment in time. As the receiving communication device's response time varies, the time-out periods of sending communication device timers will vary accordingly. Thus, the throughput and delay problems of fixed value timers are overcome.

Figure 1:
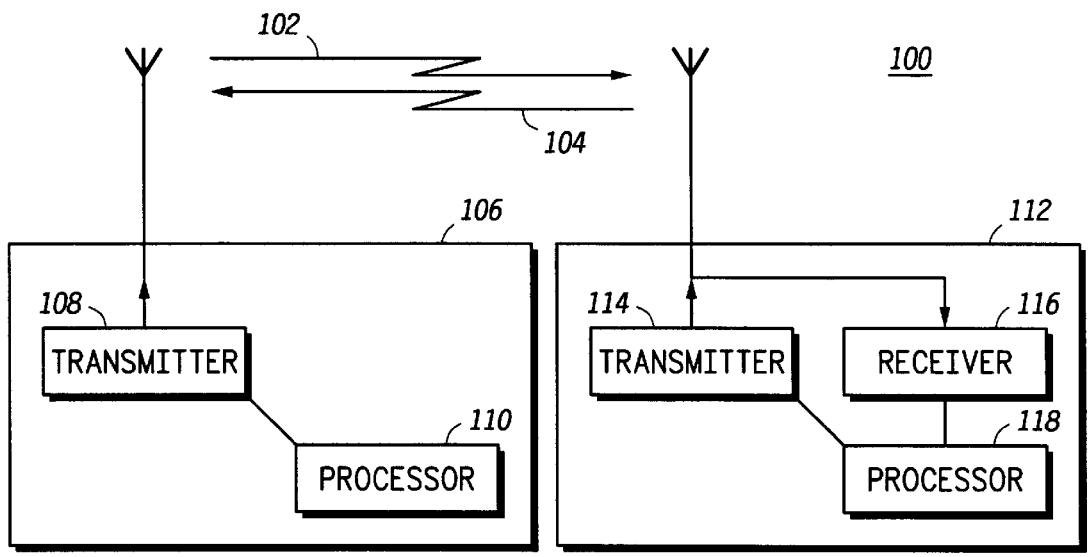
FIG. 1 illustrates a block diagram depiction of two communication devices in accordance with a preferred embodiment of the present invention.

The present invention can be more fully understood with reference to FIGS. 1–4. FIG. 1 illustrates a block diagram depiction of two communication devices 106, 112 in accordance with a preferred embodiment of the present invention. Each communication device 106, 112 comprises a transmitter 108, 114 and a processor 110, 118. The transmitters 108, 114 preferably comprise well-known circuitry and software such as that used in amplifiers, modulators, up converters, and filters. The processors 110, 118 each preferably comprise a microprocessor. The communication device 112 comprises a receiver 116 that preferably comprises well-known circuitry and software such as that used in amplifiers, demodulators, down converters, and filters. Either of the communication devices 106, 112 could be a mobile or portable radio communication unit or a fixed base station such as the Base Radio (BR) product that is commercially available from Motorola, Inc. of Schaumburg, Ill.

Operation of the two preferred communication devices 106, 112 occurs substantially as follows in accordance with the present invention. The processor 110 of the target communication device 106 determines a length of time needed to transmit outbound information. Preferably, the outbound information is queued in an outbound transmit queue, and the processor 110 determines the length of time needed to transmit the outbound information by determining the length of the outbound transmit queue and the rate at which the outbound information will be transmitted.

The processor 110 then generates an indication of a timer value based on the length of time the processor 110 determined necessary to transmit the outbound information. In a preferred embodiment, the indication is a message that specifies a timer value for the sending communication device 112 to use when starting subsequent acknowledgment timers. The timer value indicated is, preferably, the length of time the processor 110 determined necessary to transmit the outbound information plus a configurable fixed timer value. The fixed timer value allows time for other delays such as propagation and processing to be incorporated into the timer value indicated.

Finally, transmitter 108 of the target communication device 106 transmits the indication of the timer value via a communication resource 102. In a preferred embodiment, the communication resources 102, 104 are time divisioned channels that comprise time slots. Preferably, the indication is not transmitted to a particular communication device but rather broadcast via a time slot of communication resource 102 to all communication devices monitoring communication resource 102.

The receiver 116 receives from the target communication device 106 the indication of the timer value. Using the communication resource 104, the transmitter 114 of the sending communication device 112 transmits information to the target communication device 106. Using the indication of the timer value, the processor 118 of the sending communication device 112 determines a timer length and starts a timer with the timer length. The timer is associated with the transmitted information, and, preferably, is an acknowledgment timer that will expire should an acknowledgment not be received for the transmitted information. Also, since the indication is preferably a message that specifies a timer value, the specified timer value is preferably used without modification as the timer length for the acknowledgment timer.

Figure 2:
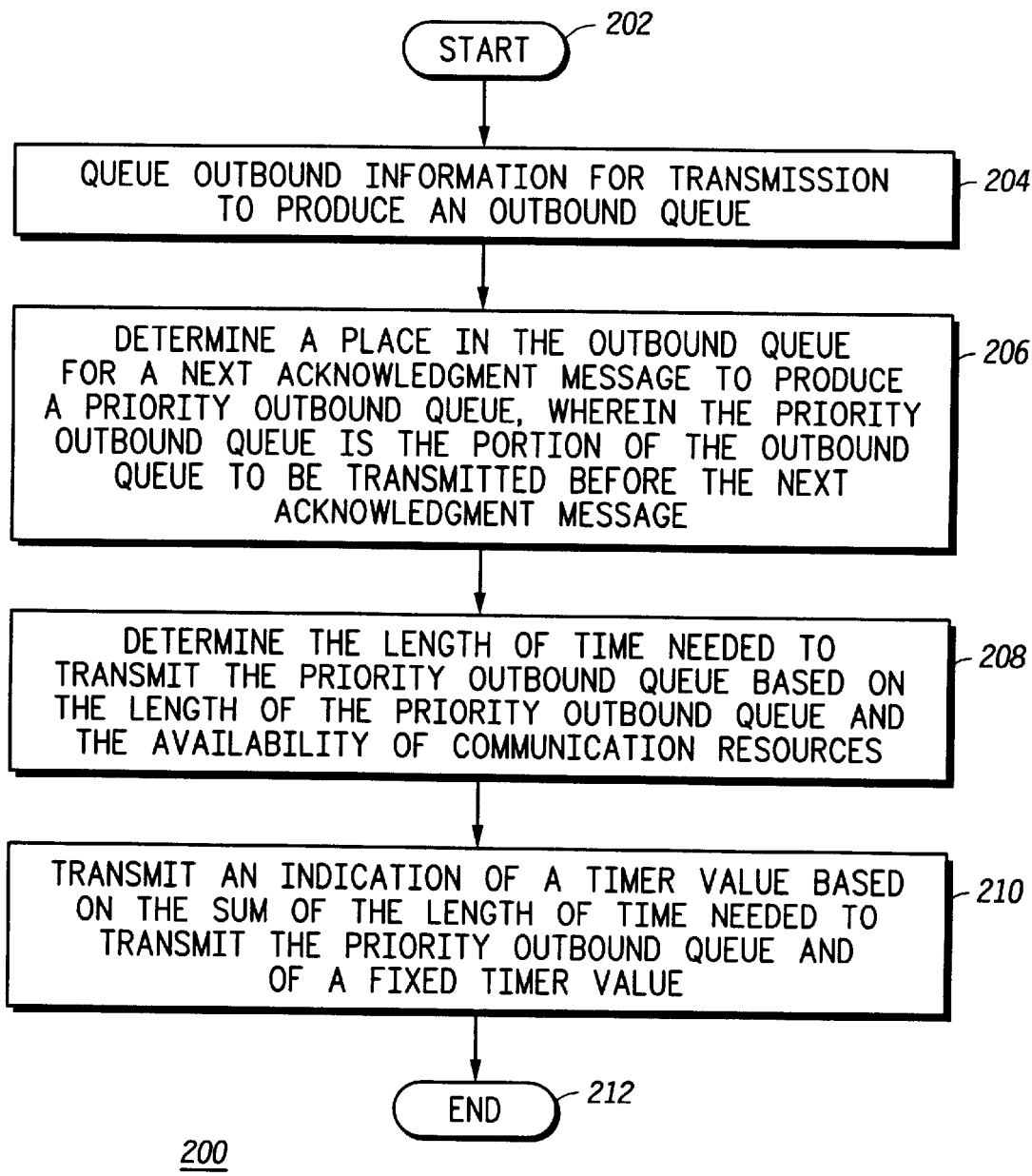
FIG. 2 illustrates a logic flow diagram of steps executed by a communication device to transmit an indication of a timer value in accordance with a preferred embodiment of the present invention.

FIG. 2 illustrates a logic flow diagram 200 of steps executed by a communication device to transmit an indication of a timer value in accordance with a preferred embodiment of the present invention. The logic flow begins (202) when the communication device queues (204) outbound information for transmission to produce an outbound queue. In the preferred embodiment, the outbound information may contain one or more data packets or one or more acknowledgments for received data packets. When the communication device receives the next data packet, the communication device will generate an ACK and place the ACK in the outbound queue. Preferably ACKs are given priority over data packets in transmission and are thus often placed in the outbound queue ahead of waiting data packets. Without actually receiving a data packet, the communication device determines (206) a place in the outbound queue for a next ACK message to produce a priority outbound queue. The priority outbound queue is the portion of the outbound queue to be transmitted before the next ACK message would be transmitted.

The communication device then determines (208) the length of time needed to transmit the priority outbound queue. Preferably, such a determination is made based on the length of the priority outbound queue and on the availability of communication resources. Other communication traffic such as voice calls supported by the communication device, can reduce the number of communication resources, time slots preferably, available for transmitting the priority outbound queue. In the preferred embodiment, each time the time needed to transmit the priority outbound queue is computed, the current priority outbound queue length and the current communication resource allocations are used. Preferably, then, the step of determining (208) results in a time derived from instantaneous values only. In an alternate embodiment, the present computation is combined with previous computations to produce a moving average of the length of time needed to transmit the priority outbound queue. Alternatively, then, the step of determining (208) results in an time derived from a moving average of instantaneous values.

Upon determining the length of time needed to transmit the priority outbound queue, the communication device transmits (210) to one or more sending communication devices an indication of a timer value based on the length of time needed to transmit the priority outbound queue. The length of time, whether determined from instantaneous conditions or by using a moving average, is used to determine the timer value indicated. Since in the preferred embodiment, the timer value is an acknowledgment timer value, a fixed timer value is added to the timer length in determining the timer value to be indicated. An optimal acknowledgment timer value is more than just the length of time needed to transmit the priority outbound queue. An optimal acknowledgment timer value should include all known or expected delays. Thus, the fixed timer value is added to the timer length to account for delays other than the delay required to transmit the priority outbound queue.

In the preferred embodiment, the timer value is indicated using 4 bits that specify a position in a look-up table. The look-up table contains 16 pre-defined timer values. The look-up table position of the pre-defined timer value closest to the timer value computed is transmitted. Receiving communication devices then use the indicated timer value from the look-up table. In an alternate embodiment, however, a bit that indicates one of two timer values is transmitted, instead, to conserve the communication device's limited transmission bandwidth.

In the preferred embodiment, the indication is transmitted via a dedicated control time slot. Periodically, a time slot is allocated to transmit control information. Time slots thus allocated are considered dedicated control time slots. Preferably, periodic timer value indications are transmitted via such dedicated control time slots since receiving communication devices monitor the dedicated control time slots for other timely control information. Alternatively, the timer value indications may be transmitted within channel grant messages. A channel grant message is transmitted to a communication device to notify the communication device that a channel has been allocated for information transmission by the communication device. Channel grant messages, however, are not transmitted periodically as the dedicated control time slots are. Upon transmitting the indication of the timer value, the logic flow ends (212).

Figure 3:
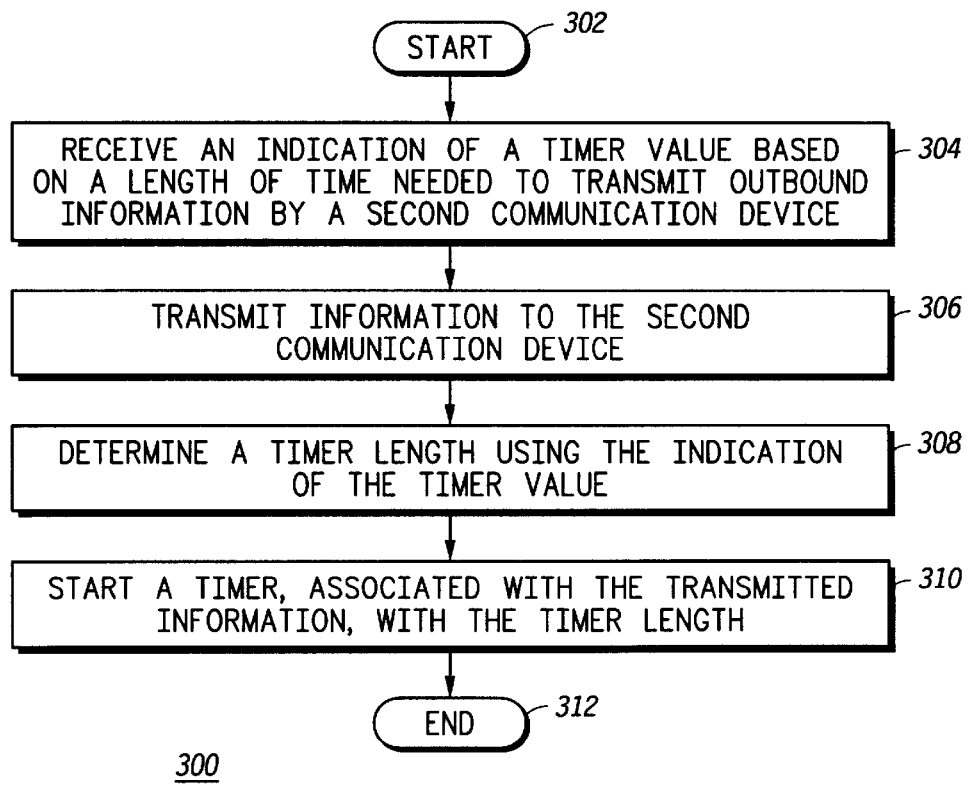
FIG. 3 illustrates a logic flow diagram of steps executed by a communication device to transmit information in accordance with a preferred embodiment of the present invention.

FIG. 3 illustrates a logic flow diagram 300 of steps executed by a communication device to transmit information in accordance with a preferred embodiment of the present invention. The logic flow begins (302) when a sending communication device receives (304) an indication of a timer value from a target communication device. The timer value is based on the length of time needed by the target communication device to transmit the target communication device's outbound information. Since the outbound information will be transmitted by the target communication device before any response to newly received information, the length of time needed to transmit the outbound information is a lower bound for the target communication device's response time.

The sending communication device transmits (306) information to the target communication device and determines (308) a timer length using the indication of the timer value. In the preferred embodiment, the information transmitted to the target communication device may have been one or more data packets. Since the sending communication unit must retransmit the data packets if an ACK is not received for the particular data packets, an acknowledgment timer is started to define a time period in which the ACK should be received. Preferably, the sending communication device starts (310) an acknowledgment timer, associated with the transmitted information, with a time-out period equivalent to the timer value in the indication. In the preferred embodiment, the indication is a message that specifies an acknowledgment timer value to the nearest second.

In an alternate embodiment, however, the indication may specify the length of time required to transmit outbound information by the target communication device but not an acknowledgment timer value to be used by the sending communication device. Like the target communication device in the preferred embodiment, the sending communication device in the present alternate embodiment adds a fixed timer value to the timer value from the indication to determine the time-out period for the acknowledgment timer started. Finally, upon starting the acknowledgment timer, the logic flow ends (312).

FIG. 4 illustrates a logic flow diagram 400 of steps executed by a communication device to transmit information in accordance with an alternate embodiment of the present invention. In the above description of logic flow diagram 300, a preferred method for a sending communication device to convey information to a target communication device was described. Like the preferred embodiment, the alternate embodiment logic flow begins (402) when a sending communication device receives (404) an indication of a timer value from a target communication device. The sending communication device transmits (406) information to the target communication device, determines (408) a timer length using the indication of the timer value, and starts (410) a timer, associated with the information transmitted, with the timer length.

The alternate embodiment differs from the preferred embodiment in the method for starting subsequent timers. The sending communication device transmits (412) subsequent information to the target communication device and determines (414) whether the original information transmitted to the target communication device was acknowledged before the timer expired. If the original information transmitted to the target communication device was acknowledged before the timer expired, the length of the timer is considered too long. On the other hand, if the original information transmitted to the target communication device was not acknowledged before the timer expired, the length of the timer is considered too short.

Before starting a second timer with a modified timer length, some checking is performed. When the length of the timer is determined to be too long, the length of the timer is compared (416) to a lower threshold. When the length of the timer is determined to be too short, the length of the timer is compared (424) to an upper threshold. If the length of the timer is not greater than a lower threshold when the length of the timer is too long or the length of the timer is not less than an upper threshold when the length of the timer is too short, the sending communication device starts (422) a second timer with the same timer length as the original timer. If, however, the length of the timer is greater than the lower threshold when the length of the timer is too long, the timer length is decremented (418) and a second timer is started (420) with the decremented timer length. Otherwise, if the length of the timer is less than the upper threshold when the length of the timer is too short, the timer length is incremented (426) and a second timer is started (428) with the incremented timer length. In any case, upon starting a second timer, the logic flow ends (430).

In the alternate embodiment discussed above, the upper and lower thresholds serve to keep the timer length within a pre-defined range. Incrementing above the upper threshold and decrementing below the lower threshold are not allowed. Also, the amount of each timer length increment or decrement within the range is pre-defined. Optimal values for the upper threshold, the lower threshold, the increment amount, and the decrement amount are pre-determined to fit the particulars of a target communication environment.

The present invention encompasses a method and apparatus for starting acknowledgment timers based on indications from acknowledging communication devices. With this invention, reliable information transfer can occur without the delay and throughput problems common to information transfer between communication devices with widely varying communication response times. In the prior art, timers of a pre-determined, fixed length are used when waiting for a response from a responding communication device. In the present invention, however, the length of such response timers is determined in real-time based on one or more indications from the responding communication device. Such responding communication devices determine the time needed to respond to the next information received and transmit an indication of the expected delay. Response timers are thus dynamically tuned to responding communication device conditions. Thus, the present invention avoids the delay and throughput problems during information transfers caused by static response timers.

While the present invention has been particularly shown and described with reference to particular embodiments thereof, it will be understood by those skilled in the art that various changes in form and details may be made therein without departing from the spirit and scope of the present invention.

We claim:

1. A method for a first communication device to indicate a timer value to a second communication device for use in starting an acknowledgment timer, the method comprising the steps of:

determining a length of time needed to transmit outbound information; and transmitting to the second communication device an indication of a timer value based on the length of time needed to transmit the outbound information, so that the second communication device can start an acknowledgment timer based on the indication.

2. The method of claim 1, wherein the step of determining comprises the step of determining the length of time needed to transmit outbound information based on a length of at least one outbound transmit queue.

3. The method of claim 1, wherein the step of determining comprises the step of determining the length of time needed to transmit outbound information based on an availability of communication resources.

4. The method of claim 1, wherein the outbound information is transmitted before an acknowledgment for newly received information is transmitted.

5. The method of claim 1, wherein the outbound information comprises a data packet.

6. The method of claim 1, wherein the outbound information comprises an acknowledgment for a received data packet.

7. The method of claim 1, wherein the timer value is an acknowledgment timer value.

8. The method of claim 1, wherein the step of transmitting comprises the step of transmitting to the second communication device a bit that indicates one of two timer values.

9. The method of claim 1, wherein the step of transmitting comprises the step of transmitting to the second communication device an indication of a timer value based on a moving average of the length of time needed to transmit outbound information.

10. The method of claim 1, wherein the indication is transmitted via a dedicated control time slot.

11. The method of claim 1, wherein the indication is transmitted within a channel grant message.

12. The method of claim 1, wherein the step of transmitting comprises the step of transmitting to the second communication device an indication of a timer value based on a sum of the length of time needed to transmit the outbound information and of a fixed timer value.

13. A method for a first communication device to indicate a timer value to a second communication device for use in starting an acknowledgment timer, the method comprising the steps of:

queuing outbound information for transmission to produce an outbound queue;

determining a place in the outbound queue for a next acknowledgment message to produce a priority outbound queue, wherein the priority outbound queue is a portion of the outbound queue to be transmitted before the next acknowledgment message;

determining a length of time needed to transmit the priority outbound queue; and transmitting to the second communication device an indication of a timer value based on the length of time, so that the second communication device can start an acknowledgment timer based on the indication.

14. A method of starting an acknowledgment timer by a first communication device, the method comprising the steps of:

receiving an indication of a timer value based on a length of time needed to transmit outbound information by a second communication device;

transmitting information to the second communication device;

determining a timer length using the indication of the timer value; and starting a timer, associated with the information transmitted, with the timer length.

15. The method of claim 14, wherein the step of determining comprises the step of determining the timer length by adding a fixed timer value to the timer value.

16. The method of claim 14, further comprising the steps of:

transmitting subsequent information to the second communication device;

determining whether the information transmitted to the second communication device was acknowledged before the timer expired;

when the information transmitted to the second communication device was acknowledged before the timer expired, determining whether the timer length is greater than a lower threshold;

when the timer length is greater than a lower threshold, decrementing the timer length to produce a decremented timer length;

starting a second timer with the decremented timer length;

when the timer length is not greater than a lower threshold, starting a second timer with the timer length;

when the information transmitted to the second communication device was not acknowledged before the timer expired, determining whether the timer length is less than an upper threshold;

when the timer length is less than an upper threshold, incrementing the timer length to produce an incremented timer length;

starting a second timer with the incremented timer length; and when the timer length is not less than an upper threshold, starting a second timer with the timer length.

17. A communication device comprising:

a processor that determines a length of time needed to transmit outbound information and that generates an indication of timer value based on the length of time determined; and a transmitter, coupled to the processor, that transmits the indication of the timer value, so that a second communication device can start an acknowledgment timer based on the indication.

18. A communication device comprising:

a receiver that receives from a second communication device an indication of a timer value based on a length of time needed to transmit outbound information by the second communication device;

a transmitter that transmits information to the second communication device; and a processor, coupled to the receiver and the transmitter, that determines a timer length using the indication of the timer value and that starts a timer, associated with the information transmitted, with the timer length.

* * * * *